United States Patent
Hart

(10) Patent No.: US 11,174,395 B2
(45) Date of Patent: Nov. 16, 2021

(54) TWO COMPONENT ALIPHATIC POLYURETHANE/POLYUREA/POLYASPARTIC COATING

(71) Applicant: Bio Care Technology, LLC, Ontario, CA (US)

(72) Inventor: Richard E. Hart, Newport Beach, CA (US)

(73) Assignee: Bio Care Technology, LLC, Ontario, CA (US)

( * ) Notice: Subject to any disclaimer, the term of this patent is extended or adjusted under 35 U.S.C. 154(b) by 0 days.

(21) Appl. No.: 16/258,238

(22) Filed: Jan. 25, 2019

(65) Prior Publication Data

US 2020/0239702 A1  Jul. 30, 2020

(51) Int. Cl.
| | |
|---|---|
| C09D 5/02 | (2006.01) |
| C09D 7/48 | (2018.01) |
| C09D 7/63 | (2018.01) |
| C08K 5/14 | (2006.01) |
| C09D 175/04 | (2006.01) |
| C09D 177/04 | (2006.01) |
| C08K 5/56 | (2006.01) |
| C09D 175/02 | (2006.01) |

(52) U.S. Cl.
CPC ............... C09D 5/025 (2013.01); C09D 7/48 (2018.01); C09D 7/63 (2018.01); C08K 5/14 (2013.01); C08K 5/56 (2013.01); C09D 175/02 (2013.01); C09D 175/04 (2013.01); C09D 177/04 (2013.01)

(58) Field of Classification Search
CPC .... C09D 5/025; C09D 175/04; C09D 175/06; C09D 175/08; C09D 5/14; C08L 75/04
See application file for complete search history.

(56) References Cited

U.S. PATENT DOCUMENTS

| | | | | |
|---|---|---|---|---|
| 5,693,703 A | * | 12/1997 | Hart | C08G 18/0823 524/502 |
| 6,403,701 B1 | * | 6/2002 | Reusmann | C08G 18/0823 427/372.2 |
| 8,084,132 B1 | * | 12/2011 | Lezdey | C08G 18/3228 428/423.1 |
| 2008/0103282 A1 | * | 5/2008 | Nagamatsu | C08G 18/0823 528/61 |
| 2014/0378611 A1 | * | 12/2014 | Nakao | C08G 18/3821 524/839 |

FOREIGN PATENT DOCUMENTS

| | | | | |
|---|---|---|---|---|
| WO | WO-2007070649 A2 | * | 6/2007 | ............. A01N 25/34 |
| WO | WO-2018102152 A1 | * | 6/2018 | ............... C09D 5/14 |

OTHER PUBLICATIONS

STERIL 101 Technical Data Sheet, BioCare Technology, Jan. 2017, 1 page.*
Covestro (Polyisocyanates and Prepolymers, Covestro, 2019, 48 pages).*
Ciba (Tinuvin 1130, 1997, 4 pages).*
BioCare Technology, LLC. Safety Data Sheet, Steril 101, Part A. Internet: http://biocaretechusa.com/home/wp-content/uploads/2017/01/Steril-101-A-SDS.pdf.
Prepared on Feb. 10, 2016. Uploaded on Jan. 28, 2017. 2 pages.

* cited by examiner

*Primary Examiner* — Brieann R Johnston
(74) *Attorney, Agent, or Firm* — Aslan Law, P.C.

(57) ABSTRACT

A polymer based antimicrobial coating composition comprising water; polyol; paint additives; hexamethylene diisocyanate (HDI hardener); a catalyst; and an antimicrobial agent, wherein said water takes up between 30% to 35% of the polymer composition by weight, and the polymer has a pentane adipate diol with dimethyl propionic acid functionality with an acid number from 75 to 95 and hydroxyl number from 320 to 360, and amounts to 12% to 15% of the polymer composition by weight.

5 Claims, No Drawings

TWO COMPONENT ALIPHATIC POLYURETHANE/POLYUREA/POLYASPARTIC COATING

CROSS REFERENCE OF RELATED APPLICATIONS

This application claims the benefits of U.S. provisional application No. 62/436,940, filed Dec. 20, 2016 and entitled TWO COMPONENT ALIPHATIC POLYURETHANE/POLYUREA/POLYASPARTIC COATING, which provisional application is incorporated by reference herein in its entirety

FIELD OF THE INVENTION

The present invention relates generally to a system and method for donning and coating a polymer-based coatings, in particular, a two-component aliphatic polymer-based coating with antimicrobial properties, so as to provide support and protection for the body and enable protection from bacterial cases. More so, a system and method for donning and coating an antimicrobial polymer layer on surfaces in order to provide a sterile environment empty of bacteria and other foreign pathogens or contaminants.

BACKGROUND OF THE INVENTION

The following background information may present examples of specific aspects of prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

A major problem for hospitals and clinics is the spread of infectious diseases, such as multi-strain resistant staph, aka "MRSA." Every year, lives are lost because of the spread of such infections. Hospitals have resorted to enforcing proper hand washing practices, using gloves, masks and other protective clothing, and even having tissues and hand cleaners be available throughout the building. In addition, these institutions spend time and money using various disinfecting cleaning products in an effort to prevent the spread of said infectious diseases. These products must be used on a continual basis, and effectiveness relies on the competency and reliability of the cleaning personnel.

However, hospitals are on a tight budget, and the cost of continually purchasing disinfectant products is a consideration. But, the infectious disease problem in hospitals and clinics is more serious than time and money. The main concern is the health and safety of the patient. Over 2 million patients contract hospital-acquired infections each year. A patient admitted with a heart condition, for example, can be at risk of contracting staph or other bacteria while hospitalized. See Orange County Register Article, attached herein in Exhibit A, as an example. Each year in the U.S. thousands of patients are being treated for hospital acquired infections, and sadly, a certain percentage lose their lives. An improved approach to address this problem would be desirable.

Hospital-acquired infections, known as nosocomial infections, are those that are not present in the patient at the time of admission to the hospital but develop during the course of their stay. There are two forms of hospital infections: endogenous infection and cross-infection. Endogenous infections, also known as "self-infection" or "auto-infection", are those where the causative agent of the infection is present in the patient at the time of admission to hospital but there are no signs of infection. Typically, the infection develops during the patient's stay at the hospital due to the patient's altered immune system. Cross-infections occurs during the patient's stay in the hospital when he or she comes into contact with new infectious agents and become contaminated.

Typically healthy individuals have a normal general resistance to infections, but patients such as newborn babies, elderly folks, or just patients with underlying diseases are more prone to infections in hospitals.

In any healthcare facility, the sources of infection and of any preceding contaminations may originate from personnel, patients, or even from the inanimate environment and surrounds. Thus, hospitals can be seen to be pathogenic-prone environments if not maintained properly. This includes maintaining the water distribution system, upholding food safety standards, and keeping an sophisticated water cooling system for air conditioning equipment present at all times.

Microorganisms can be transmitted from their source to a new host through direct or indirect contact, in the air, or by vectors. Vector-borne transmission is typical of countries in which insects, arthropods, and other parasites are widespread. These become contaminated by contact with excreta or secretions from an infected patient and transmit the infective organisms mechanically to other patients.

Airborne transmission occurs only with microorganisms that are dispersed into the air and that are characterized by a low minimal infective dose. Only a few bacteria and viruses are present in expired air, and these are dispersed in large numbers only as a result of sneezing or coughing. Direct contact between patients does not usually occur in health-care facilities, but an infected health-care worker can touch a patient and directly transmit a large number of microorganisms to the new host.

The most frequent route of transmission, however, is indirect contact. The infected patient touches—and contaminates—an object, an instrument, or a surface. Subsequent contact between that item and another patient is likely to contaminate the second individual who may then develop an infection. During general care and/or medical treatment, the hands of health-care workers often come into close contact with patients. The hands of the clinical personnel are thus the most frequent vehicles for nosocomial infections. Transmission by this route is much more common than vector-borne or airborne transmission or other forms of direct or indirect contact As a result, studies have provided the needed evidence to demonstrate that hospital-based programs that are dedicated in improving antibiotic use in hospitals can optimize the treatment of infections, reduce any adverse events that may occur, as well as positively affect bottom-line healthcare costs. See Wolters Kluwer Article, attached here in Exhibit A, as a reference. The fear of increasing numbers of antibiotic-resistant diseases means hospitals are seeking other prevention methods from traditional antibiotic supplement to combat the spread of infectious disease.

Two basic principles govern the main measures that should be taken in order to prevent the spread of nosocomial infections in health-care facilities: separate the infection source from the rest of the hospital OR cut off any possible route of transmission. See Guidelines for Prevention of Hospital Acquired Infections attached here in Exhibit A, as a reference.

The separation of the source normally includes the isolation of the infected individual/patient and the aseptic techniques, i.e. the measures taken to act as barriers between the infected and the environment, other patients, and personnel. Of course, it is impossible to avoid all contact with infected tissue or potentially contaminated body fluids, excreta, and/or secretions. As a result, all objects that come in contact with patients are typically assumed to be potentially infected. Unfortunately, even with awareness of the potential dangers of spreading infectious diseases, many healthcare establishments are still unable to achieve adequate levels of prevention due to a variety of reasons that can include financial costs and burdens, inefficiency of use, or inadequate resources.

Many hospitals follow procedures to lower the possibility of infectious diseases spreading. These steps include focusing on cleaning, sterilizing, and even isolating. Cleaning has been considered to be one of the most basic measures for maintaining a level of hygiene. Soaps and detergents are used to act as solubility-promoting agents, rinsing away bacteria and other microorganisms and having them be suspended in said liquid and then removed from the surface from which they inhabited. However, careless and superficial cleaning is ineffective and therefore narrows the line for error hospitals need to balance, or else they fail to remove an infectious bacteria from the environment. Sterilization sets an environment to be free of microorganisms. However, technically the process only reduces the number of microorganisms by a factor of more than $10^6$. This means that a standard sterilizing process of a medical instrument or environment lives behind only one instrument or environment out of a 1,000,000 infected.

Proposals thus far have involved temporary measures to combat the spread of infectious diseases while no long-term solutions have been considered. Even though the above cited antimicrobial measures address the medical field's need for combative measures against infectious diseases, none provide a durable and fiscally sustainable option that is so desired right now.

SUMMARY OF THE INVENTION

The polymer-based coatings, in particular, a two-component aliphatic polymer-based coating with antimicrobial properties provides a layer of protection and prevention of the spread of diseases or contaminants in a given setting. The polymer-based coating is comprised of a two-part composition that, when combined, Other systems, methods, features and advantages of the invention will be or will become apparent to one with skill in the art upon examination of the following figures and detailed description. It is intended that all such additional systems, methods, features and advantages included within this description be within the scope of the invention and be protected by the accompanying claims.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure which is defined by the claims. For purposes of description herein, the terms.

One approach to reduce risk of infection in a hospital is to apply an antimicrobial coating to the floor. But, one challenge is to make this coating durable, especially on a floor with a lot of foot and machine traffic. One type of coating in accordance with an embodiment of the present invention is described below. It is a two-component aliphatic polymer-based coating with antimicrobial properties, which offers an improved way to prevent growth of various infectious diseases. The tradename is STERIL-101, which is a clear gloss high performance polymer. This polymer is water based, and does not use any volatile organic compound ("VOC"). Further, it has no odor.

This polymer product has been tested by an independent Antimicrobial Test Laboratory for resistance to a wide range of microbial agents. Results are attached as Exhibit A to this specification. For example, STERIL-101 eliminated the MRSA with a reduction of 99.999.5%. See Exhibit B, Antimicrobial Test Laboratories, Study Report, Page 9, Carrier Type B.

The STERIL-101 coating can be applied to a surface using a conventional paint brush, roller, or spray system. The coating can cure to a tack free finish in 4 to 5 hours, depending on temperature. The coating is also highly chemical and acid resistant, and its effectiveness can last up to 5 years with just one coat application at a rate of 300 to 400 sq.ft/gallon. The coating can be applied to almost any surface or material including fabric.

In a preferred embodiment, STERIL-101 is a two-component (Part A and Part B) aliphatic polyurethane/polyurea/polyaspartic, clear, high-gloss protective coating with antimicrobial properties. The coating can be supplied as a high-solid concentrate and is mixed at 1:1 ratio and then reduced 50% with water. This combination results in a solid content from 45% to 50% solids by weight.

Part A of the polymer compound primarily comprises of water at approximately 66%, polyols at approximately 22% of the polymer's total composition, and paint additives in the composition account for approximately 12% of the polymer's total composition. In addition, part B of the polymer compound primarily comprises of solid hexamethylene diisocyanate ("HDI").

Part A is formulated with an equivalent molecular weight ranging approximately-between 340 to 375. Note that the hydroxyl number of approximately 150-OH. The stoichiometric indexing ratio of NCO to OH is approximately OH=1, NCO=2.33. The indexing is "NCO high" due to the water content of the part A. See Docket No. RHART.001.P2.

The catalyst used is dibutyltin dilaurate, a organotin compound.

The antimicrobial agent is a 2:1 blend of emulsified water-based silver solution and zinc-pyrithione.

The formulation is mixed at room temperature (72° F.) and is a water based polymer dispersion system. Preferably, mixing speed is low to medium. When the formulation is completed, the result is a clear dispersion with a slight yellow tint and no odor.

The polymer would include water that takes up between 30% to 35% of the polymer total composition.

The polymer would include carboxylic functional acrylate rheology additive with an acid number from 40 to 70, which would amount to 2% to 4% of the polymer's total composition.

The polymer would include a paint additive that is also a defoamer.

The paint additive in the polymer would amounts to 4% to 7% of the total polymer composition.

The resulting polymer would contain an ultraviolet light stabilizer that amounts to 2% to 3% of the polymer's total composition.

The polymer would contain reactive surfactant, 3-n-pentadecylphenol, with an equivalent weight of from 250 to 300, amounting between 2% to 4% of the polymer's total composition.

The polymer would contain a diamine with an equivalent weight ranging from 130 to 160, and amount to 5% to 7% of the polymer's total composition.

The resulting polymer would contain the chemical pentane adipate-diol with dimethyl propionic acid functionality with an acid number ranging from 75 to 95 and a hydroxyl number ranging from 320 to 360, amount to about 12% to 15% of the polymer's total composition.

The polymer would have trimethylol propane ("TMP") with an equivalent weight ranging from 35 to 50, and amounting 3% to 5% of the polymer's total composition.

The polymer would also have a polyaspartic ester with an equivalent weight ranging from 250 to 300, and amounting 3% to 5% contribution to the polymer's total composition.

The polymer would also contain a HDI hardener with an NCO content of 18% to 20% that also has an equivalent weight ranging from 190 to 240, and amounts from 30% to 35%.

Antimicrobial additive, e.g., silver solution and zinc pyrithione, amount from 0.75% to 1.25% Docket No. RHART.001.P2

Some notable advantages to the formulation described above:

The polymer provides excellent antimicrobial properties, as shown in Exhibit A.

The polymer comprises of high performance chemical and acid resistance and excellent U.V. resistance, especially that of non-yellowing presentation.

When part A and Part B of the polymer are mixed at a 1:1 ratio, the resulting polymer compound can be reduced up to 60% with just water and still maintain its effectiveness.

The polymer has the property of having zero VOC.

The polymer product has a 1.5 hour working time and will dry to a tack free high gloss finish in 4 to 5 hours at room temperature (i.e. 72° F., 50% relative humidity).

Good adhesion qualities for many surfaces, including aluminum and stainless steel, without the need of a primer.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for antimicrobial coatings; however, the invention can be used for any coating in general. As a further example, each feature of one embodiment can be mixed and matched with other features shown in other embodiments. Additionally and obviously, features may be added or subtracted as desired. Accordingly, the invention is not to be restricted except in light of the attached claims and their equivalents.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A polymer based antimicrobial coating composition comprising:
    water;
    polyol;
    paint additives;
    hexamethylene diisocyanate (HDI hardener);
    a catalyst; and
    an antimicrobial agent, wherein
    said water takes up between 30% to 35% of the polymer composition by weight, and
    the polymer has a pentane adipate diol with dimethyl propionic acid functionality with an acid number from 75 to 95 and hydroxyl number from 320 to 360, and amounts to 12% to 15% of the polymer composition by weight.

2. The polymer composition of claim 1, wherein the paint additive is a defoamer.

3. The polymer composition of claim 1, wherein the paint additive amounts to 4% to 7% of the polymer composition by weight.

4. The polymer composition of claim 1, wherein the polymer composition has an ultraviolet light stabilizer, that amounts to 2% to 3% of the polymer composition by weight.

5. The polymer composition of claim 1, wherein the polymer composition has the HDI hardener with an NCO content of 18% to 20% by weight with an equivalent weight from 190 to 240, amount from 30% to 35% by weight.

* * * * *